US012241294B1

(12) United States Patent
Russell

(10) Patent No.: US 12,241,294 B1
(45) Date of Patent: Mar. 4, 2025

(54) LOCKING APPARATUS FOR COMMUNITY MAILBOX

(71) Applicant: Kevin Russell, Bakersfield, CA (US)

(72) Inventor: Kevin Russell, Bakersfield, CA (US)

(*) Notice: Subject to any disclaimer, the term of this patent is extended or adjusted under 35 U.S.C. 154(b) by 0 days.

(21) Appl. No.: 18/799,349

(22) Filed: Aug. 9, 2024

(51) Int. Cl.

| | |
|---|---|
| ***E05C 19/08*** | (2006.01) |
| ***A47G 29/12*** | (2006.01) |
| ***A47G 29/124*** | (2006.01) |
| *A47G 29/00* | (2006.01) |

(52) U.S. Cl.
CPC .......... *E05C 19/08* (2013.01); *A47G 29/1201* (2013.01); *A47G 29/124* (2013.01)

(58) Field of Classification Search
CPC ..... Y10T 292/23; Y10T 292/31; E05C 19/08; A47G 29/124; A47G 29/1245; A47G 29/126; E05B 65/44; E05B 65/462; E05B 65/467; E05B 65/468; E05B 67/36; E05B 67/38; E05B 67/383
See application file for complete search history.

(56) References Cited

U.S. PATENT DOCUMENTS 1,318,800 A * 10/1919 Radcliff .................. E05C 19/08 292/281
1,342,361 A * 6/1920 Veith ........................ E05C 19/08 292/281
1,389,450 A * 8/1921 Kules ....................... E05C 19/08 292/281
2,803,512 A * 8/1957 Band ...................... E05B 65/467 312/298
2,913,296 A * 11/1959 Martin .................. E05B 65/467 292/259 R
3,893,740 A * 7/1975 England ................ E05B 65/467 312/216
5,103,659 A * 4/1992 Benefield, Sr. ....... E05B 17/142 70/164
5,172,574 A * 12/1992 Perfetto .................. E05B 67/38 292/281
5,267,688 A * 12/1993 Benefield ........... A47G 29/1201 70/164
6,247,641 B1 * 6/2001 Noblet ............... A47G 29/1201 232/24
6,327,878 B1 * 12/2001 Levenson ............. E05C 19/182 70/2

FOREIGN PATENT DOCUMENTS

DE 102006027021 B3 * 11/2007 ......... A47G 29/1201
GB 2509899 A * 7/2014 ............. E05B 65/46

* cited by examiner

*Primary Examiner* — Carlos Lugo
(74) *Attorney, Agent, or Firm* — James M. Duncan; Scanlon Duncan LLP

(57) ABSTRACT

A locking apparatus for a community mailbox prevents the opening of the main access door through which a mail carrier may gain access to the interiors of all of the individual mailboxes of the community mailbox. The locking apparatus has a mounting plate which is configured to be attached to an outer housing of the community mailbox. A stop plate is pivotally attached to the mounting plate. The stop plate is configured to be locked into a first position which prevents the opening of the main access door. The stop plate is further configured such that when unlocked, the stop plate may be pivoted into a second position which allows the opening of the main access door.

10 Claims, 7 Drawing Sheets

LOCKING APPARATUS FOR COMMUNITY MAILBOX

BACKGROUND OF THE INVENTION

Community mailboxes, such as that disclosed in U.S. Pat. No. 6,247,641, and as shown in FIG. 1 herein are known for providing receipt of mail for multiple recipients, with each recipient having a dedicated box for receiving pieces of mail. Each dedicated box has a locking access door whereby each recipient can open with their assigned key to gain access to their mail. The community mailbox also has parcel receipt boxes. A mail carrier may deliver larger parcels to the parcel receipt boxes and leave the key to a specific parcel receipt box in the appropriate dedicated box. The community mailbox also has an outgoing mail drop box. The outgoing mail drop box has a slot through which outgoing mail may be deposited for pickup by a mail carrier. The mail carrier has the key for opening the door to the outgoing mail drop box to collect any mail deposited into the box.

As shown in FIG. 2, the community mailbox has double swinging doors which allow the mail carrier to gain access to the interiors of each individual box allowing the easy depositing of each recipient's mail into that recipient's dedicated box. The double swinging doors are opened by levers which are accessible to the mail carrier through the outgoing mail drop box. Thus, a mail carrier gains access to all the individual boxes and the parcel receipt boxes of the community mailbox by unlocking the outgoing mail drop box and activating the levers to open the double swinging doors. While providing convenient access for the mail carrier, this configuration also allows a thief to gain access to all the mail delivered to the community mailbox by drilling out the single lock of the outgoing mail drop box and actuating the levers of the double swinging doors, thereby allowing the opening of the double swinging doors into the position shown in FIG. 2, such that a thief has access to all of the individual boxes and to the parcel receipt boxes.

Various solutions have been suggested to prevent theft of mail from community mailboxes. For example, one proposed solution is to install locking panels which bar access to all of the individual mailboxes. Another proposed solution is to place protective gates which prevent access to all of the individual mailboxes. However, the disadvantage of both of these solutions is that each system requires that each mail recipient having a mailbox in the community mailbox have the key or combination to the panels or protective gates, thereby creating inconvenience to each recipient and the possibility of a recipient either failing to relock the panels or protective gates. In addition, because each mail recipient has a key or combination to the panels or protective gates, there is an increased likelihood of the key or combination becoming available to unauthorized persons.

SUMMARY OF THE INVENTION

The presently disclosed locking apparatus provides a solution to the above-described problem by providing a locking apparatus which addresses the problem by preventing the opening of the door of the outgoing mail drop box and thereby preventing access to the levers which allow opening the double swinging doors. Unlike the above-described solutions, the present invention may only be opened by the mail carrier and it does not impose any inconvenience to the individual mail recipients and it only allows the locking apparatus to be opened by the mail carrier.

For purposes of this disclosure, a "community mailbox" is generally shown in FIGS. 1-2 and is of the type having an outer housing, a first double door, a second double door, and a mail access door, wherein the first double door and the second double door are configured to be opened by accessing a latch mechanism through the mail access door. Only the mail carrier will have the key to the mail access door which, but for tampering with the locking mechanism, only allows the mail carrier access to all of the individual mail boxes.

This latch mechanism is referred to within U.S. Pat. No. 6,247,641 as a "sliding linkage lever" which the post person lifts to disengage door pins "so that both doors are able to swing free and expose all of the interior mail slots." Once the double doors have been opened, a mail carrier may easily place mail into each of the individual mailboxes or place parcels into the parcel receipt boxes. When the double doors have been closed, each individual with a mailbox may retrieve their mail separately by opening the door to their mailbox with a key unique to their mailbox. Unfortunately, if the locking mechanism of the mail access door is defeated by drilling out the mechanism or by otherwise defeating the single lock, a thief will have access to all of the mail deposited within the community mailbox.

An embodiment of the disclosed locking apparatus may comprise a device which may be independently locked to prevent the opening of the mail access door—thereby preventing access to the interior latch mechanism—while still allowing the opening of each of the doors to the individual mailboxes by the mail recipients. A method preventing access to the interior latch mechanism is disclosed herein, where the method is to attach a locking apparatus to the community mailbox where the locking apparatus comprises a stop plate having a first position where the stop plate is disposed immediately adjacent the mail access doorthereby preventing opening of the mail access door but allowing the opening of the individual mailbox doors. The stop plate has a second position which allows opening of the mail access door. The stop plate may be locked into the first position with a lock. The mail carrier will have a key or combination to the lock, thereby allowing the mail carrier to open the mail access door and activate the interior latch mechanism and gain access to all of the individual mailboxes.

An embodiment of the disclosed locking apparatus may also comprise a mounting plate which is configured to attach to an outer housing of the community mailbox. A stop plate is pivotally attached to the mounting plate by a hinge. The stop plate is configured to pivot from a first position to a second position. In the first position, the stop plate is adjacent to the door of the outgoing mail drop box and prevents the door from swinging open. If the door cannot be swung open, there is no access to the levers which allow the double swinging doors to open. When the stop plate is pivoted to the second position, the door of the outgoing mail drop box may be opened and thereby allow access to the levers which allow the double swinging doors to open. A lock prevents the stop plate from pivoting from the first position to the second position until the lock is unlocked by the mail carrier.

DETAILED DESCRIPTION OF THE INVENTION

Figure 1:
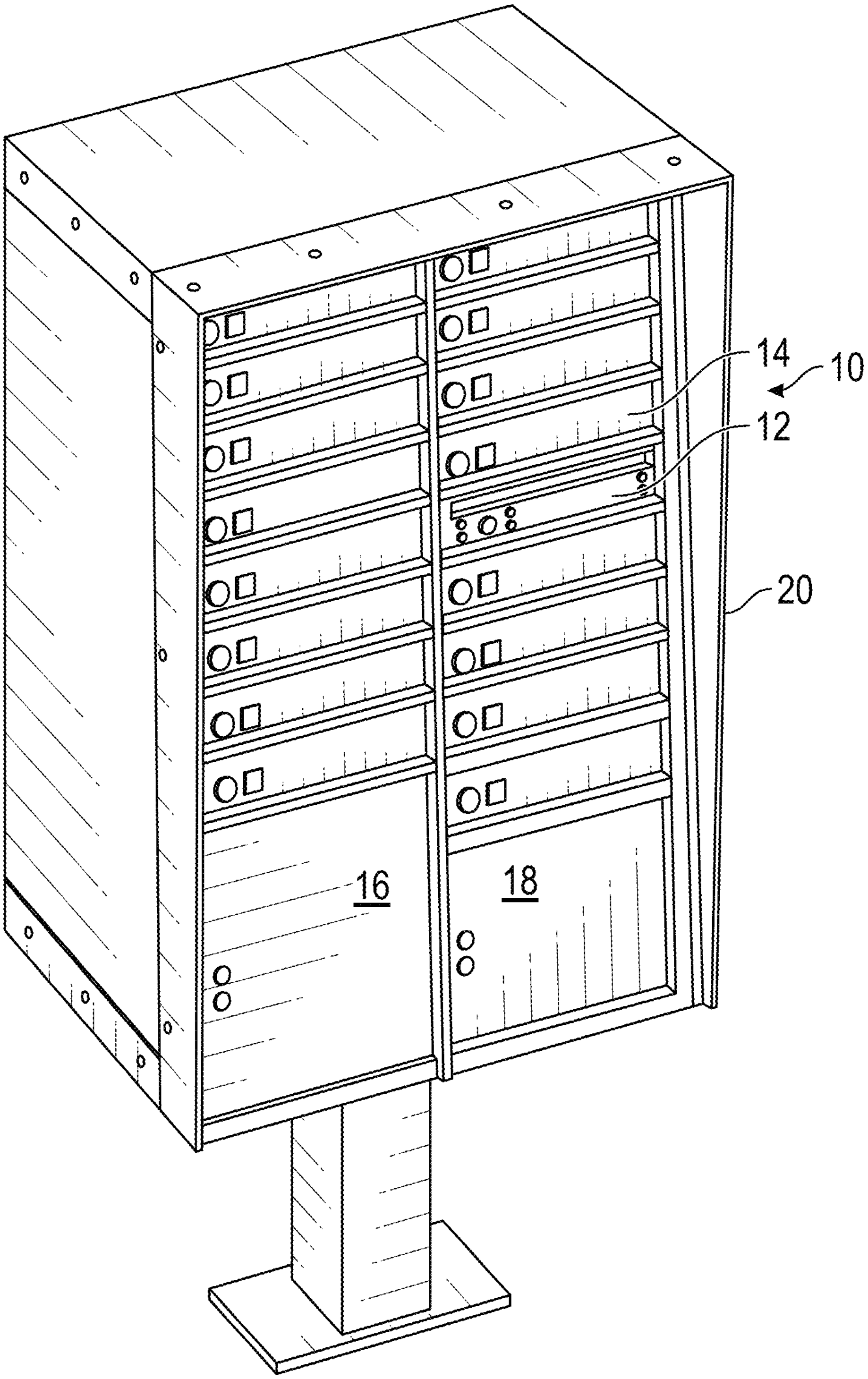
FIG. 1 (Prior Art)
FIG. 1 depicts an embodiment of a known community mailbox in a closed position.
Figure 2:
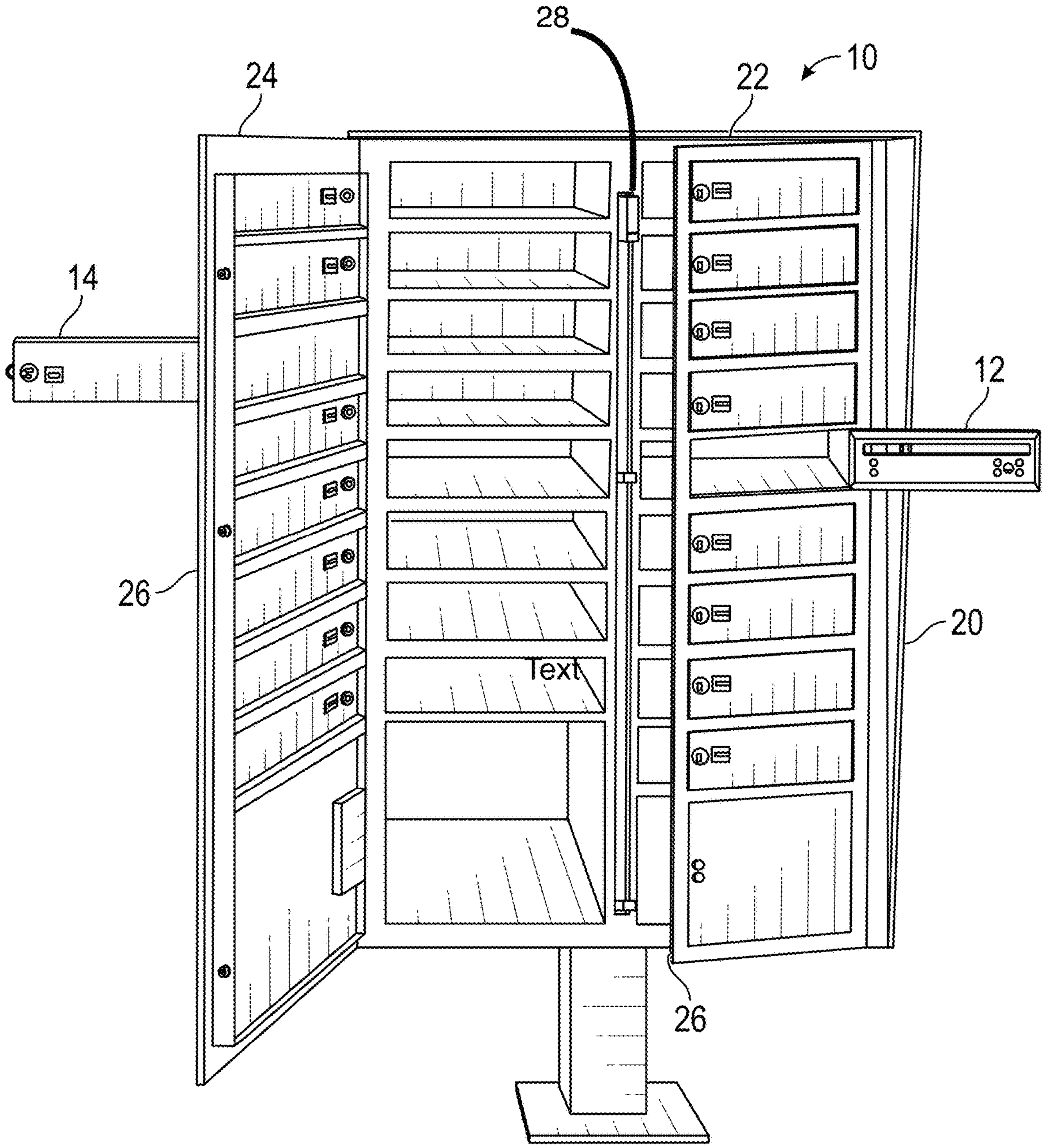
FIG. 2 (Prior Art)
FIG. 2 shows the community mailbox of FIG. 1 in an open position.

Referring now to the drawing figures, FIGS. 1-2 depict a known community mailbox which may be further secured by utilizing the presently disclosed locking apparatus. As shown in FIGS. 1-2, the community mailbox 10 has a main access door 12 to which a mail carrier will have a key for opening. The term "main access door" shall be understood within this disclosure to be referring a door of the community mailbox which the mail carrier may open to gain access to an interior latch mechanism which allows the mail carrier to gain access to all of the internal boxes contained within the community mailbox 10.

The main access door 12 will typically have a mail slot through which outgoing mail may be deposited for pick up by the mail carrier. The community mailbox 10 has a plurality of individual mailbox doors 14, each having a separate key assigned to the owner of that particular mailbox. The community mailbox 10 may also have a large package door 16 and a small package door 18 which allow the mail carrier to deposit packages intended for specific mail recipients and leave a key to either the large package door or small package door inside a particular mailbox, allowing the package recipient to gain access to the package enclosures. Community mailbox 10 has outer housing 20 which provides for an enclosure of all the individual mailboxes.

Once the main access door 12 is opened as shown in FIG. 2, there is access to the interior latch mechanism 28 which allows the first double door 22 and the second double door 24 to be swung open. Second double door 24 may have a door flange 26 which engages a corresponding door flange 26 of first double door 22, thereby preventing first double door 22 from opening until second double door 24 has been opened, or vice-versa.

Figure 3:
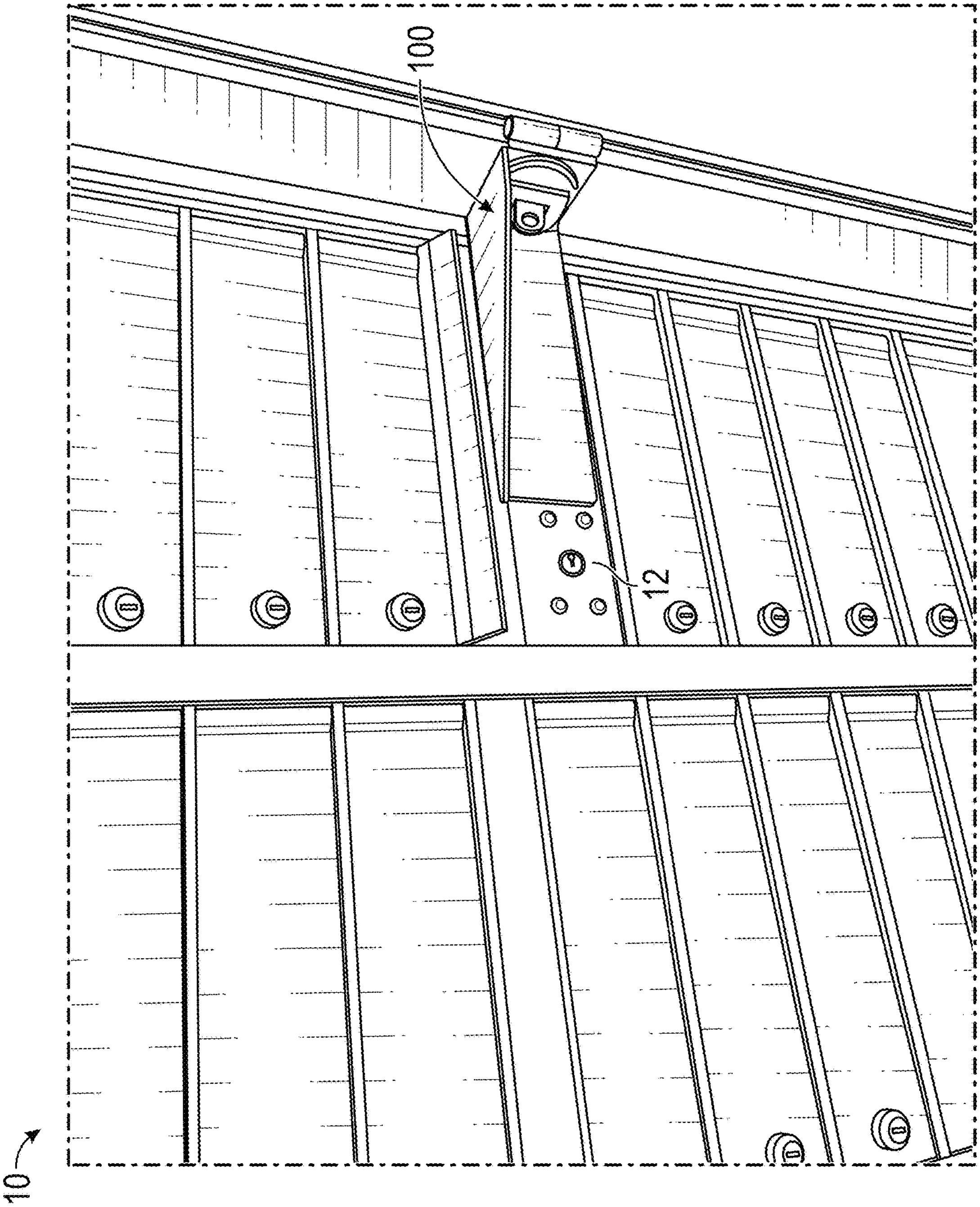
FIG. 3 depicts an embodiment of the disclosed locking apparatus installed on a community mailbox.
Figure 4:
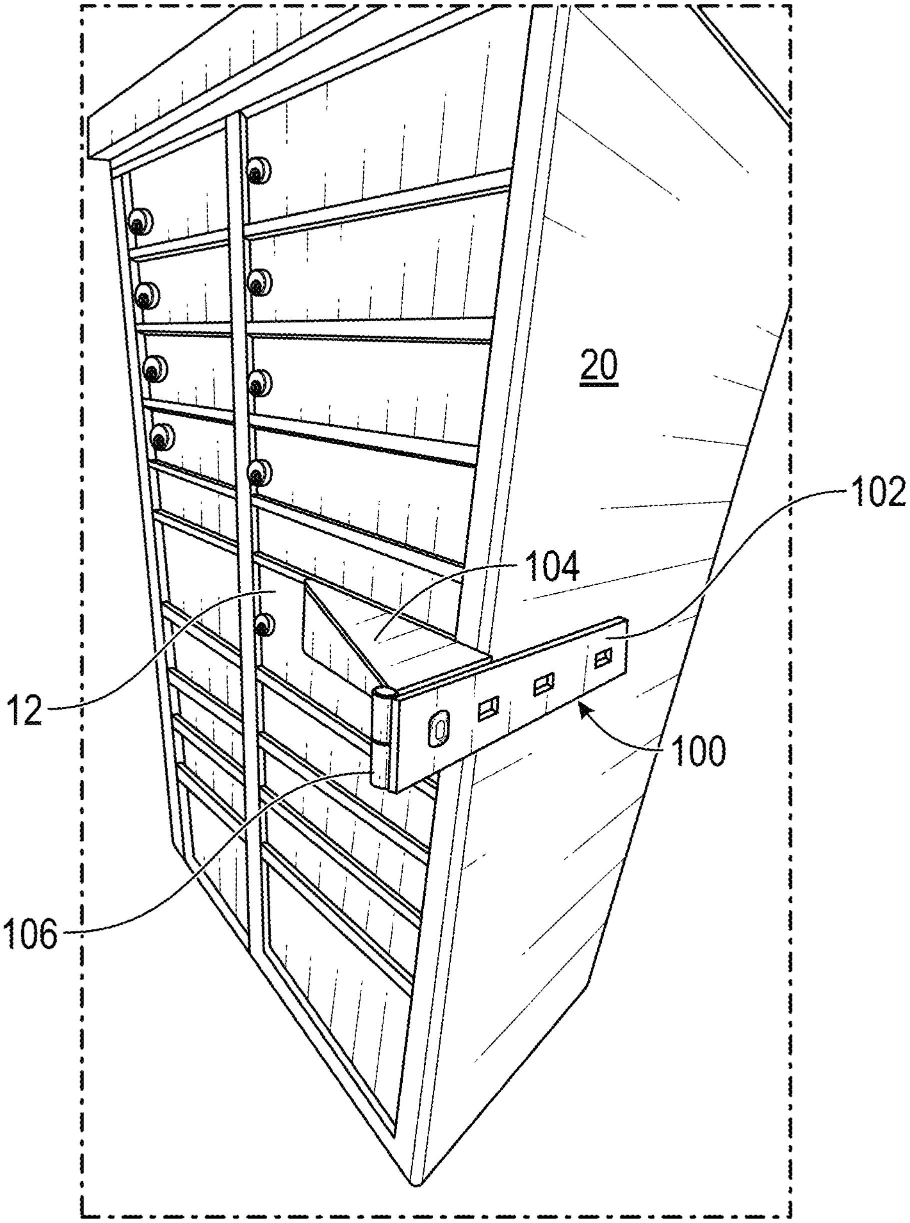
FIG. 4 shows an oblique view of the community mailbox showing how the disclosed locking apparatus is attached.

FIGS. 3-4 show an embodiment of the presently disclosed locking apparatus 100 attached to community mailbox 10. As shown in FIG. 3, locking apparatus 100 prevents the opening of main access door 12 when the locking apparatus is in the closed position, as depicted in FIG. 3, but allowing each of the individual mailbox doors 14, the large package door 16 and a small package door 18 to be opened as desired. FIGS. 3-4 depict the locking apparatus 100 in a first position in which stop plate 104 of the apparatus is disposed immediately adjacent the main access door 12 thereby preventing opening of the mail access door 12 and preventing access to the interior latch mechanism 28. Thus, the utilization of the presently disclosed locking apparatus 100 in conjunction with community mailbox 10 resists the opening of the mail access door 12 and access to the interior latch mechanism 28 by unauthorized persons.

As illustrated in the figures, an embodiment of the disclosed locking apparatus 100 has a mounting plate 102 which attaches to the outer housing 20 by welding, by fasteners, such as carriage bolts, through bolt apertures 116, or by a combination of both. A stop plate 104 is pivotally attached to mounting plate 102 by a hinge 106 or the like. Stop plate 104 may also have a stop plate flange 108 which provides additional strength to the stop plate while also providing a barrier to the use of any device such as a hammer, drill, pry bar or the like on lock 120 which may be nestled within the protection of a right-angle corner of the stop plate 104 as shown in FIGS. 7 and 8, with the stop plate 104 having a vertical portion and an integral horizontal portion which is the stop plate flange 108.

Figure 5:
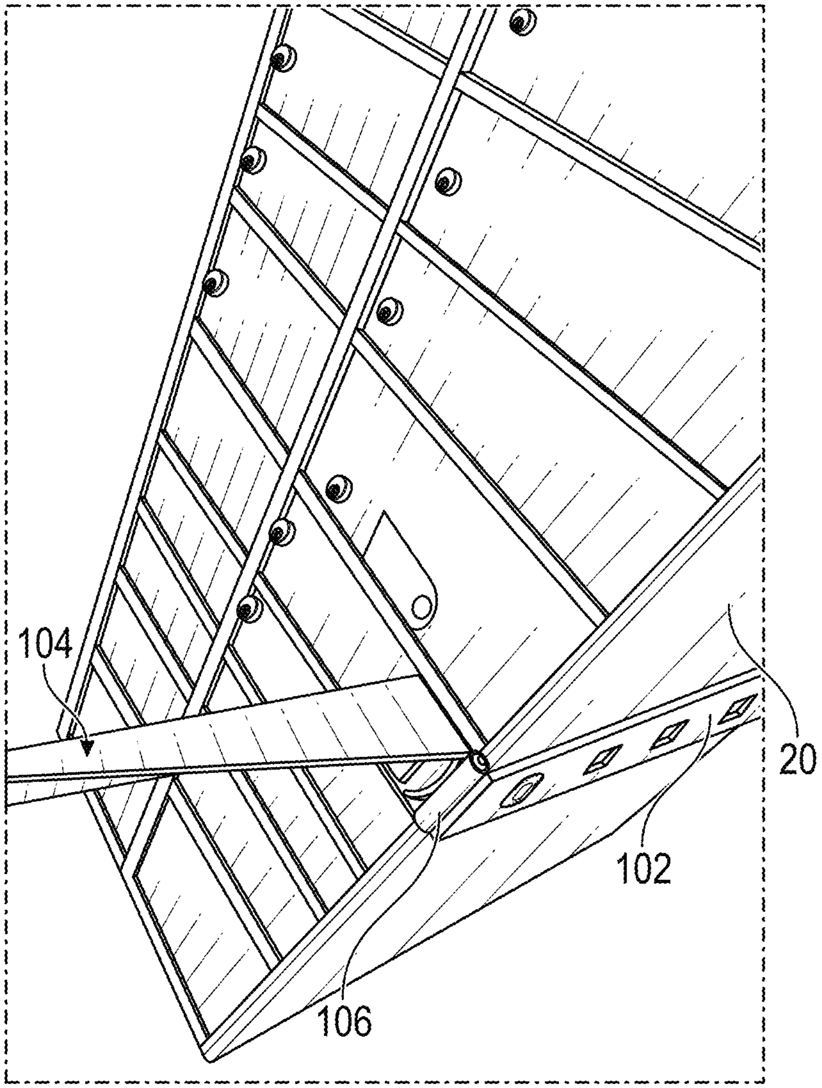
FIG. 5 shows the locking apparatus shown in FIG. 4 with the locking apparatus in an open position.
Figure 6:
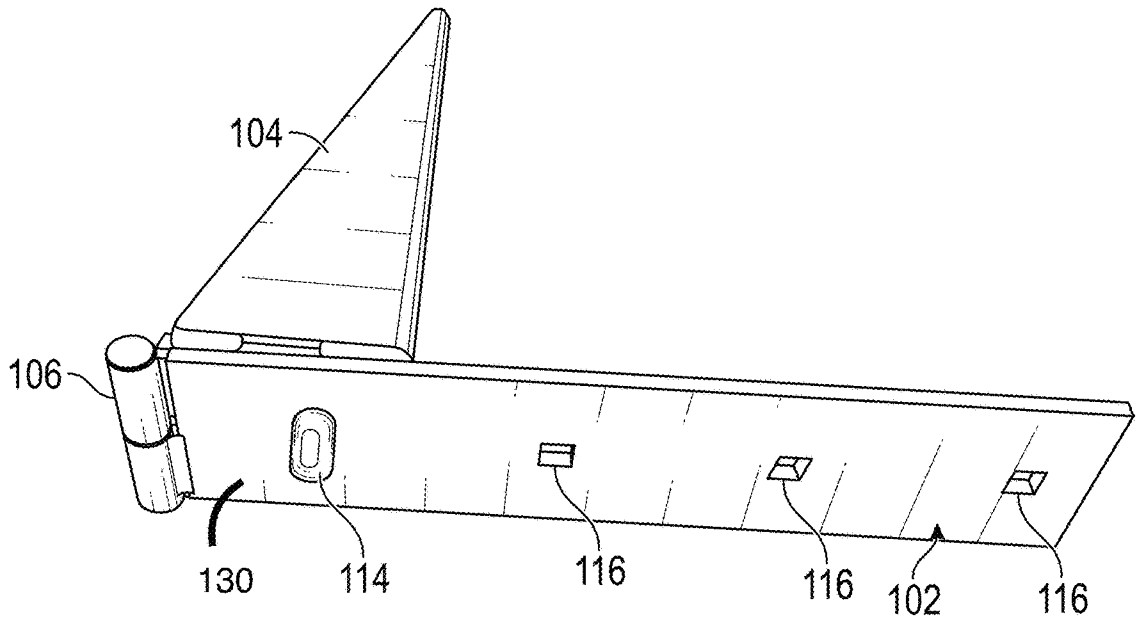
FIG. 6 shows a rear perspective view of the disclosed locking apparatus in a closed position.

FIG. 5 shows an embodiment of the disclosed locking apparatus 100 in an open position, also referred to herein as the second position. When the locking apparatus 100 is in the second position, mail access door 12 may be freely swung open thereby allowing access to interior latch mechanism 28. With this configuration, a mail carrier having either a key or combination to lock 120. When lock 120 is fastened, it maintains the stop plate 104 in a locked position. When lock 120 has been unfastened, the stop plate 104 is in an unlocked position such that a mail carrier may gain access to all of the individual boxes of the community mailbox 10 by unlocking and removing lock 120 and swinging stop plate 104 into the second position, thereby allowing the mail carrier to open mail access door 12 and actuate the interior latch mechanism 28 and open first double door 22 and the second double door 24 and deliver the mail. Upon completion of the mail delivery, the mail carrier may close first double door 22, second double door 24, shut mail access door 12, return stop plate 104 into the first position, and attach and fasten lock 120.

In an embodiment of the disclosed locking apparatus 100 the mounting plate 102 may have an end portion 130 which extends outwardly beyond the outer housing 20 of the community mailbox 10. In this configuration, a hasp 110 may be attached such that an opening of the hasp extends from the inwardly facing side of the mounting plate 102 as shown in FIGS. 7-8. Hasp 110 may be configured to have a structural integrity consistent with the mounting plate 102 with hasp 110 comprising a thick steel construction and attached to the mounting plate 102 by insertion of the hasp through an opening in the mounting plate and attaching by welding leaving hasp attachment weld 114.

Figure 7:
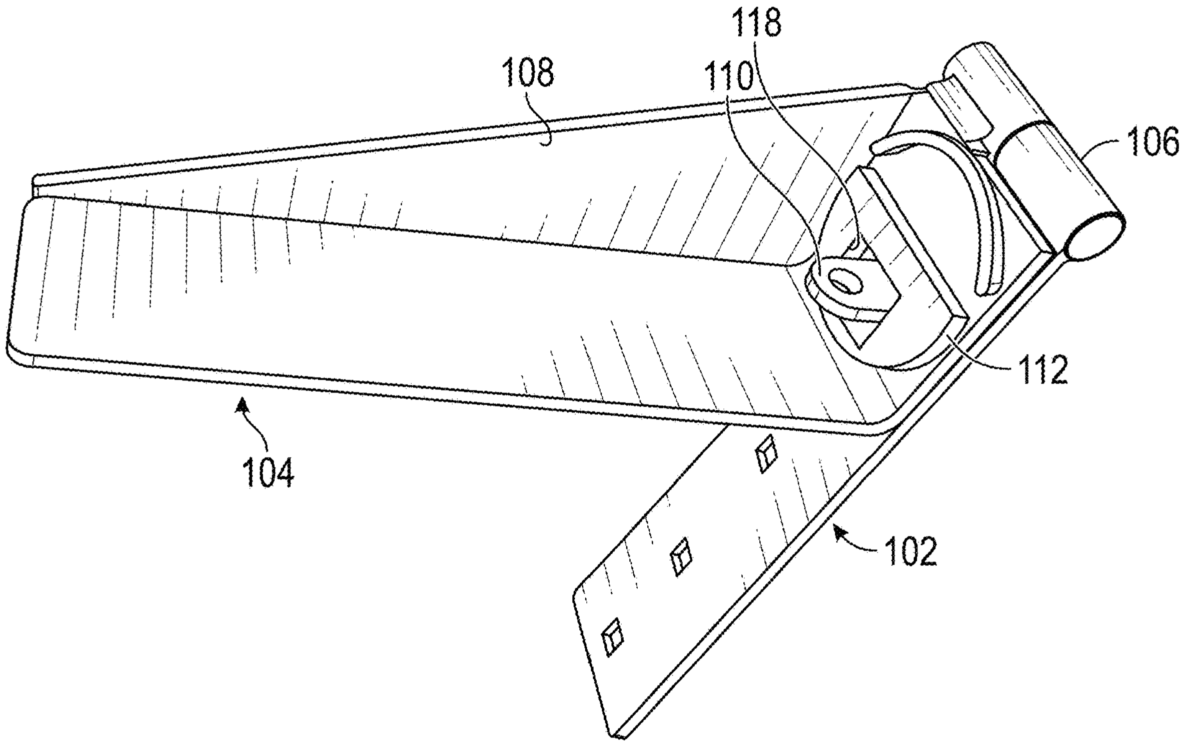
FIG. 7 shows a lower front perspective view of the disclosed locking apparatus in a closed position.
Figure 8:
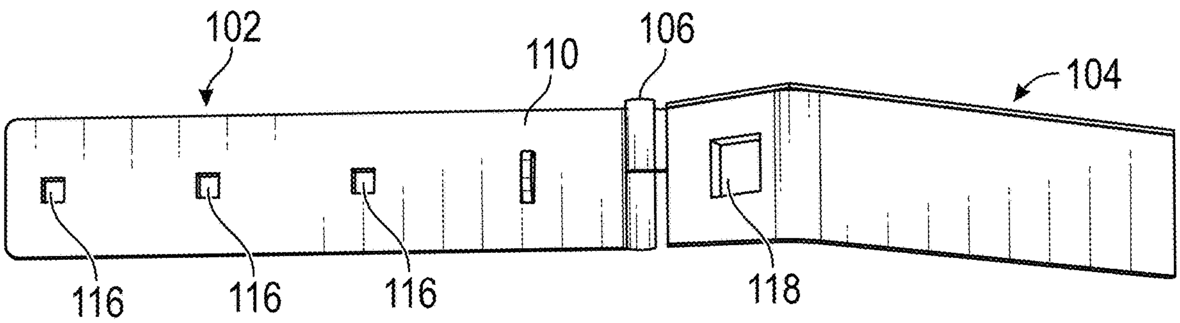
FIG. 8 shows a front perspective view of the disclosed locking apparatus pivoted into an open position.
Figure 9:
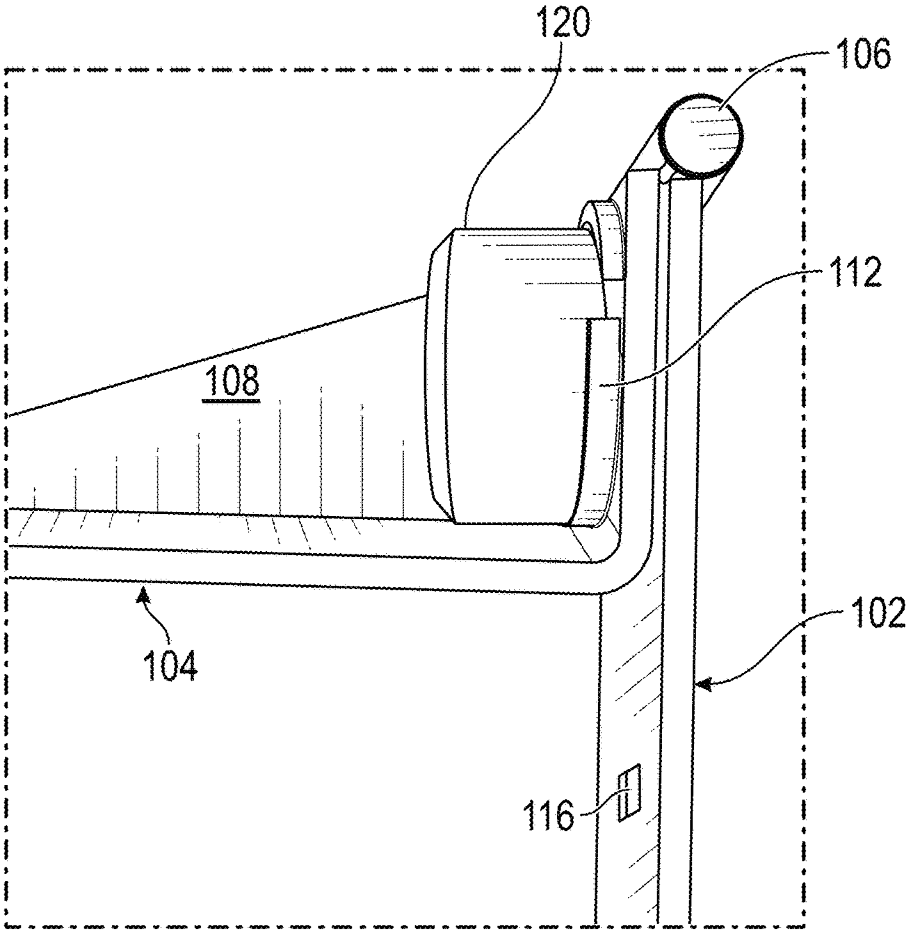
FIG. 9 shows a top perspective view of the disclosed locking apparatus in a locked position with a "hockey puck" lock attached to the staple of the locking apparatus.

When an embodiment of the disclosed locking apparatus 100 is in the first position, hasp 110 may extend through an opening 118 in stop plate 104 as shown in FIGS. 7-8. When so configured, lock 120 may be attached to hasp 110. Lock 120 may be a "hockey puck" lock which receives hasp 110 and locks onto it. As shown in FIGS. 7 and 9, the inside corner of stop plate 104 may have a lock support structure 112 which is configured to allow a lock 120 to be supported to facilitate the opening and closing process by a mail carrier. Lock support structure 112 may be configured such that its structural components mate with structural components of lock 120.

Having thus described the preferred embodiment of the invention, what is claimed as new and desired to be protected by Letters Patent includes the following:

1. A locking apparatus for use in combination with a community mailbox, wherein the community mailbox is of the type comprising a plurality of individual mail compartments disposed in an array enclosed within an outer housing wherein access to each one of the plurality of individual mail compartments is gained by activating a latch accessible through a single access door enclosing an outgoing mail drop box, the locking apparatus comprising:

a mounting plate configured to attach to a side of the outer housing of the community mailbox;

a stop plate pivotally attached to the mounting plate by a hinge, the stop plate comprising a vertical portion and an integral horizontal stop plate flange adjacent the vertical portion, the vertical portion comprising a lock support structure disposed beneath the horizontal stop plate flange, the stop plate configured to pivot from a first position adjacent the single access door at a front of the community mailbox to a second position, wherein when the stop plate is retained in the first position the single access door is prevented from opening without preventing access to any of the other individual mail compartments; and a lock which retains the stop plate in the first position, the lock configured to be supported within a right angle corner of the stop plate when the stop plate is in the first position.

2. The locking apparatus of claim 1 wherein the mounting plate comprises an end portion which extends outwardly beyond the outer housing of the community mailbox.

3. The locking apparatus of claim 2 wherein a hasp is attached to the end portion of the mounting plate, wherein the hasp extends through an opening in the lock support structure when the stop plate is in the first position.

4. The locking apparatus of claim 3 wherein the lock comprises a hockey puck lock configured to attach to the hasp.

5. A method of locking a community mailbox the community mailbox of the type having an outer housing, a first double door, a second double door, a mail access door enclosing an outgoing mail drop box, and a plurality of individual mailbox doors disposed in an array enclosed within the outer housing, wherein the first double door and the second double door are configured to be opened by accessing a latch through the mail access door, wherein the method comprises the following steps:

attaching a locking apparatus to the community mailbox, wherein the locking apparatus comprises a stop plate comprising a vertical portion and an integral horizontal stop plate flange, the stop plate further comprising a lock support structure disposed beneath the integral horizontal stop plate flange and adjacent the vertical portion wherein the stop plate has a first position where the stop plate is disposed immediately adjacent the mail access door, the lock support structure configured to support a lock when the stop plate is in the first position, and the stop plate having a second position where the stop plate is pivoted outwardly away from the mail access door, the locking apparatus further comprising a mounting plate attached to the outer housing, wherein the stop plate is pivotally attached to the mounting plate; and affixing the lock to a hasp which extends through the lock support structure when the stop plate is in the first position, the hasp attached to the mounting plate, thereby maintaining the stop plate in a locked first position wherein the stop plate prevents the mail access door from opening thereby preventing the opening of the first double door and the second double door but the stop plate does not prevent the opening of the individual mailbox doors and wherein with the lock detached from the hasp with the stop plate in the second position the mail access door is openable thereby providing access to the latch.

6. The method of claim 5 wherein the mounting plate has an end portion which extends outwardly beyond the outer housing of the community mailbox.

7. The method of claim 6 wherein the hasp is attached to the end portion of the mounting plate.

8. The method of claim 7 wherein the lock support structure comprises an opening which is configured such that the hasp extends through the opening when the stop plate is in the first position and the opening is pivoted away from the hasp when the stop plate is in the second position.

9. The method of claim 8 wherein the lock comprises a hockey puck lock configured to attach to the hasp.

10. The method of claim 9 wherein the stop plate comprises a lock support structure configured to support the hockey puck lock within a right angle corner of the stop plate when the stop plate is in the first position.

* * * * *